(12) United States Patent
Olsen

(10) Patent No.: US 7,703,985 B2
(45) Date of Patent: Apr. 27, 2010

(54) BEARING, A WIND TURBINE AND METHODS OF MANUFACTURING A BEARING

(75) Inventor: Niels Christian Olsen, Tjele (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/177,998

(22) Filed: Jul. 23, 2008

(65) Prior Publication Data
US 2008/0285903 A1 Nov. 20, 2008

Related U.S. Application Data

(63) Continuation of application No. PCT/DK2006/000038, filed on Jan. 23, 2006.

(51) Int. Cl.
*F16C 19/52* (2006.01)
(52) U.S. Cl. .................. 384/510; 384/516; 384/559
(58) Field of Classification Search ......... 384/507–511, 384/516, 537, 559, 584, 585
See application file for complete search history.

(56) References Cited

U.S. PATENT DOCUMENTS

| 997,913 | A | * | 7/1911 | Hess ..................... 384/508 |
|---|---|---|---|---|
| 1,334,027 | A | | 3/1920 | Forsberg |
| 4,568,205 | A | * | 2/1986 | Basener ..................... 384/501 |
| 5,033,873 | A | * | 7/1991 | Suzuki ..................... 384/447 |
| 2002/0073548 | A1 | | 6/2002 | De Vries et al. |

FOREIGN PATENT DOCUMENTS

EP 1524442 A1 4/2005

OTHER PUBLICATIONS

International Search Report, Sep. 21, 2006, 3 pages.
International Preliminary Report on Patentability, Jan. 23, 2006, 13 pages.

* cited by examiner

*Primary Examiner*—Thomas R Hannon
(74) *Attorney, Agent, or Firm*—St. Onge Steward Johnston & Reens LLC

(57) ABSTRACT

The invention relates to a bearing for a wind turbine comprising bearing rings with raceways, and at least one row of bearing balls or rollers positioned between said raceways. At least one of said raceways comprises one or more indentation areas in relation to a standard shape of the raceways. The invention also relates to a wind turbine and methods for manufacturing a bearing.

23 Claims, 9 Drawing Sheets

BEARING, A WIND TURBINE AND METHODS OF MANUFACTURING A BEARING

CROSS-REFERENCE TO RELATED APPLICATIONS

The present application is a continuation of pending International patent application PCT/DK2006/000038, filed Jan. 23, 2006, which designates the United States, the content of which is incorporated herein by reference.

FIELD OF THE INVENTION

The invention relates to a bearing comprising bearing rings with raceways, and at least one row of bearing rolling elements positioned between said rings and in contact with said raceways, a wind turbine and methods of manufacturing a bearing.

BACKGROUND OF THE INVENTION

Bearings are used in a wide variety of technical fields in order to support, guide, and reduce the friction of motion between different parts such as between fixed and moving parts.

The bearings may face very high load forces in some technical fields such as in the crane and wind turbine area.

The raceways of a blade bearing have to be hardened in order for the bearing to achieve acceptable sub surface fatigue properties. The normal way to harden the raceways is either by flame hardening or by induction hardening. The dominating hardening process in the industry is to either have a flame or induction tool that follow the circumferential of the bearing rings until the raceway have been hardened. Because the hardening tool only can harden a small section/fraction of the raceway at a time, the blade bearing manufacturer has to start at an arbitrary or well defined location on the bearing rings and then continue round the circumferential until the hardening tool is back to starting position.

Overlapping of the starting and finishing positions in the hardening process is not allowed in order to avoid annealing or tempering of the already hardened raceway or in order to avoid unpredictable material characteristics. As consequence hereof a small portion of the raceway is less hardened i.e. "soft spots" in the hardened raceway. The present understanding within the technical field of bearings is that the "soft spot" areas are so small that they have no influence on the bearing life.

However, this is not always the case and the object of the present invention is to establish bearing technique which provides a longer total life of a bearing.

SUMMARY OF THE INVENTION

The invention provides for a bearing wherein at least one of said raceways comprises one or more indentation areas in relation to a standard shape of the raceways.

Hereby it is possible to establish bearing technique that provide a longer total life of a bearing by transferring lower load forces on the bearing rolling elements at specific raceway positions.

The phrase "standard shape of the raceways" should be understood as the normal manufactured geometry or contour of the raceways e.g. a axial/rotational symmetrical geometry.

The use of one or more indentation areas in surface portions of the bearing raceway go against teaching within the technical area. The uniformity and consistency of the raceways and the load force on the row of bearing balls is generally considered to be of great importance in establishing a bearing.

In an aspect of the invention, said bearing rolling elements are bearing balls or rollers.

In another aspect of the invention, said bearing is connection means between different parts of a wind turbine such as a blade, yaw, rotor, gear or generator bearing of the wind turbine.

The bearings of a wind turbine generally work in hard load conditions where they may experience axial and radial forces as well as large bending/tilt moments.

Especially, blade bearings work in hard load conditions because of the presence of axial and radial forces as well as large bending/tilt moments while performing limited oscillating movements instead of a continuous rotating motion. In order to achieve a high total bearing life it is thus very advantageous to transfer lower load forces with the bearing rolling elements at specific raceway positions such as areas where the load force is higher or the bearing strength is lower.

In aspects of the invention, one or each raceway comprises one indentation area. Hereby it is assured that some or all "soft spots" of the raceways in a bearing experiences lower load forces from the bearing rolling elements such as the less hardened areas and in the filler plug areas.

In an aspect of the invention, said indentation area at least is positioned in material of a poorer bearing material characteristic than the hardened material of the raceway e.g. poorer raceway material by being less hardened, unhardened or of higher brittleness. The indentation area ensures that less load force is transferred to at least some of the area of poorer bearing material. Hereby it is avoided that bearing material in the area peels off and eventually reduce the total life of the bearing.

In an aspect of the invention, said indentation area comprises an area of poorer bearing material characteristic and transition areas in the adjacent hardened material of the raceway. Hereby it is possible to create a treated area where it is ensured that less load force is transferred from the bearing rolling element to all area of poorer bearing material.

By the phrase "poorer bearing material characteristic" is especially understood bearing material being less hardened in comparison with the adjacent hardened material. The less hardened area is considered to be material with at least 15 percent lower hardness in relation to the rest of the raceway.

In an aspect of the invention, said indentation area comprises a hole or a groove shape with a minimum depth at the transition areas. Hereby it is possible to transfer less rolling element load force to the indentation area.

In an aspect of the invention, the shape of said indentation area is well defined and reproducible by machine with a minimum depth at the transition areas. Hereby it is possible to create similar or even identical indentation areas in different raceways with the same machine procedures as well as in other bearings.

In an aspect of the invention, said indentation area comprises a double curvature shape, a bowl shaped hole or a groove with a minimum depth $X_{Ih1}$, $X_{Ih2}$ at the transition areas. Hereby it is possible to transfer the bearing rolling elements from high load forces to low load forces and vice versa through the indentation area in a continuous manner.

In an aspect of the invention, said indentation area comprises a continuous or smooth shape with a minimum depth $X_{Ih1}$, $X_{Ih2}$ at the transition areas.

The term "continuous or smooth" should be understood as a line or curve that extends without a break or irregularity such as an edge (e.g. the derivative of the indentation contour should be a continuous function).

The continuous shape ensures that a bearing rolling element transfers from high load forces to low load forces and vice versa without rolling over edges that quickly will wear down and send loose material into the bearing.

In an aspect of the invention, said indentation area stretches perpendicular across the raceway from raceway edge to edge. Hereby it is ensured that the bearing rolling elements transfer less load force in the indentation area regardless of axial or radial forces as well as large bending/tilt moments on the bearing.

In another aspect of the invention, said indentation area only stretches across parts of the raceway such as the sides or bottom of the raceway. Hereby it is possible to transfers less load force by the bearing rolling element in the indentation area when the bearing faces axial or radial forces as well as large bending/tilt moments.

In another aspect of the invention, the minimum depth $X_{lh1}$, $X_{lh2}$ at the transition area in the indentation area is at least 1 per mil of the diameter $D_b$ of the bearing balls e.g. in the range of 2 and 20 per mil. Hereby, it is possible to initially reduce or remove the load force transferred by the bearing balls to such an extend that raceway material will not peel off, deteriorate as well as reduce the complete bearing life.

In another aspect of the invention, the minimum depth $X_{lh1}$, $X_{lh2}$ at the transition area in the indentation area is at least 0.7 per mil of the diameter $D_b$ of the bearing rollers e.g. in the range of 1 and 50 per mil. Hereby, it is possible to initially reduce or remove the load force transferred by the bearing rollers to such an extend that material will not peel off, deteriorate as well as reduce the complete bearing life.

In another aspect of the invention, said indentation areas are indentations in relation to a normal base line or shape of the raceways.

In an aspect of the invention, said one or more indentation areas comprise a minimum depth $X_{lh1}$, $X_{lh2}$ at the transition area ta of at least 0.04 millimetres e.g. in the range of 0.1 to 1.5 millimetres such as between 0.2 and 0.6 millimetres in relation to the diameter $D_b$ of the bearing balls being at least 30 millimetres e.g. approximately 38.10, 44.45, 50.80, 53.98, 63.50, 76.20 or 101.60 millimetres as well as other dimensions.

In another aspect of the invention, said one or more indentation areas comprise a minimum depth $X_{lh1}$, $X_{lh2}$ at the transition area ta of at least 0.04 millimetres in relation to the diameter $D_b$ of the bearing rollers being at least 20 millimetres.

In a further aspect of the invention, each of said one or more indentation areas is less than 360 degrees e.g. less than 15 degrees of the length of a raceway. Hereby it is possible to reduce or remove the load force on at least one rolling element without causing significant influence on the overall function of the bearing.

In an even further aspect of the invention, each of said one or more indentation areas at least is positioned in a bearing contact zone of a raceway for bearing rolling elements. Hereby it is possible to reduce or remove the load force on at least one rolling element without causing significant influence on the overall function of the bearing.

BRIEF DESCRIPTION OF THE DRAWINGS

The invention will be described in the following with reference to the figures in which.

DETAILED DESCRIPTION OF THE INVENTION

Figure 1:
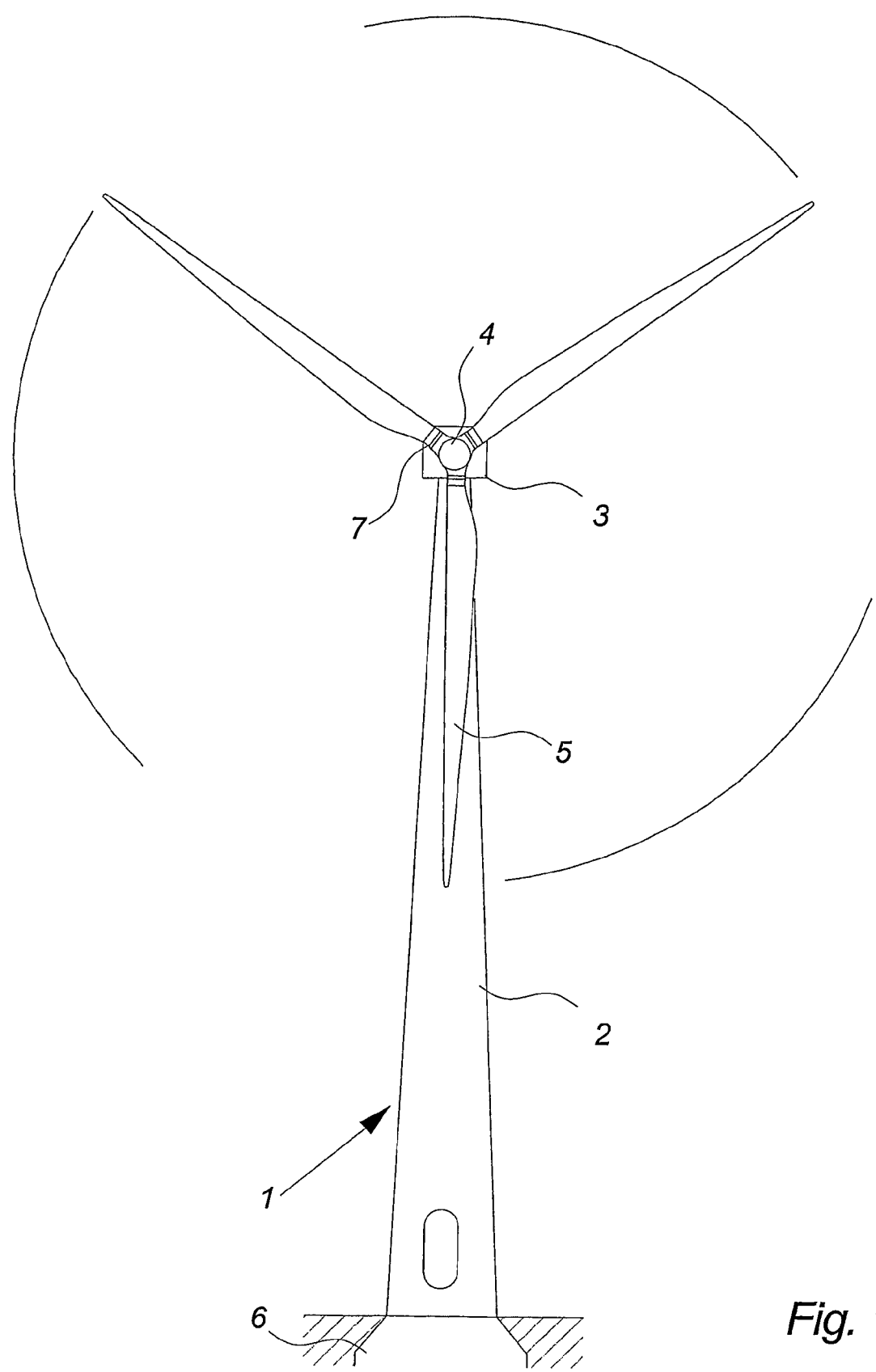
FIG. 1 illustrates a large modern wind turbine.

FIG. 1 illustrates a modern wind turbine 1 mounted on a foundation 6. The wind turbine comprises a tower 2, including a number of tower sections, and a wind turbine nacelle 3 positioned on top of the tower 2. The yaw mechanism with a yaw bearing and motors allows the nacelle to turn in relation to the tower in such a way that the wind turbine rotor may face the wind.

The wind turbine rotor, comprising at least one blade and illustrated in the figure with three wind turbine blades 5, is connected to the hub 4 through pitch mechanisms. Each pitch mechanism includes a blade bearing 7 which allows the blade to pitch in relation to the wind. The hub is connected to the nacelle through the shaft which extends out of the nacelle front. The shaft is directly connected to a generator or indirectly through a gear mechanism and low speed/high speed shafts wherein the connections may comprise one or more shaft bearings such as rotor and generator bearings.

Figure 2:
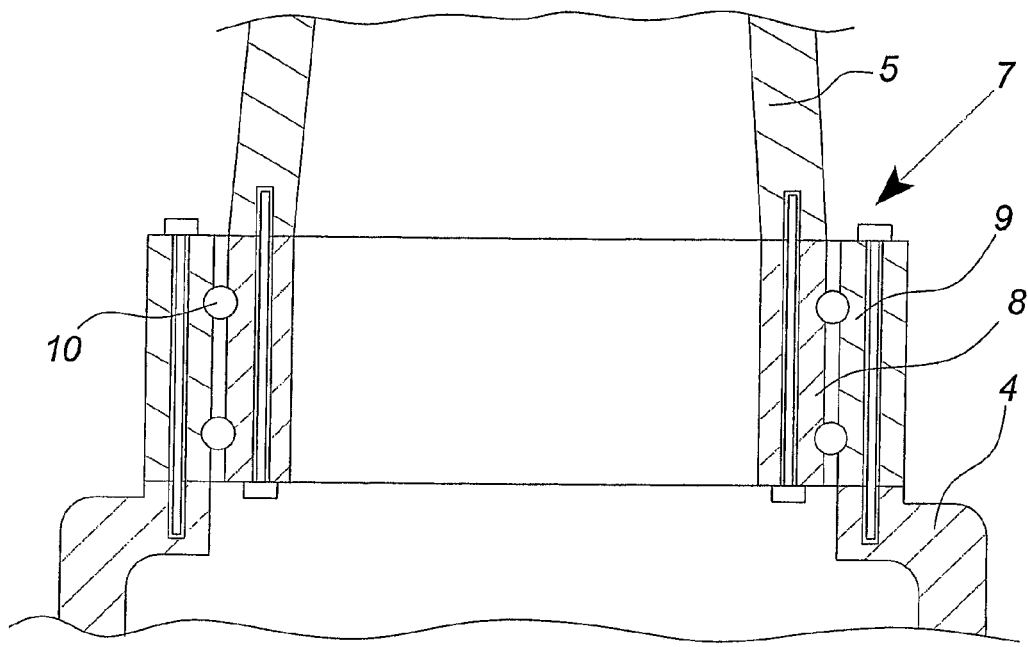
FIG. 2 illustrates an example of a blade bearing for a wind turbine.

FIG. 2 illustrates an example of a blade bearing 7 for a wind turbine. The wind turbine blade 5 is connected to the inner ring 8 of the blade bearing 7 with a number of bolts. The outer ring 9 of the blade bearing is also connected with a number of bolts to the hub 4. Between the raceways of the bearing rings 8, 9 are positioned two rows 10 of bearing balls allowing the wind turbine blade 5 to pitch in relation to the hub 4.

The wind turbine blade may also be connected to the outer ring and the hub to the inner ring in other embodiments.

Other types of bearings will be known to the skilled person within the technical area of bearings such as bearings for wind turbines and cranes.

Examples of possible bearing types:

4 point contact ball bearing,

Thrust bearings e.g. spherical roller thrust bearings, thrust ball bearings, angular contact thrust ball bearings and cylindrical roller thrust bearings, or Slewing bearings e.g. three row roller bearings (3 RRB) or two row roller+one row ball bearings (2 RRB+1 RBB), or even Self aligning ball bearings, deep groove ball bearings or angular contact ball bearings.

The rollers may for example be cylindrical, needle, tapered, barrel or spherical shaped.

Further, the bearings may comprise just one row of bearing balls or more than two rows of bearing balls such as three rows. Further, the rows may be positioned on top of or next to each other.

Figure 3:
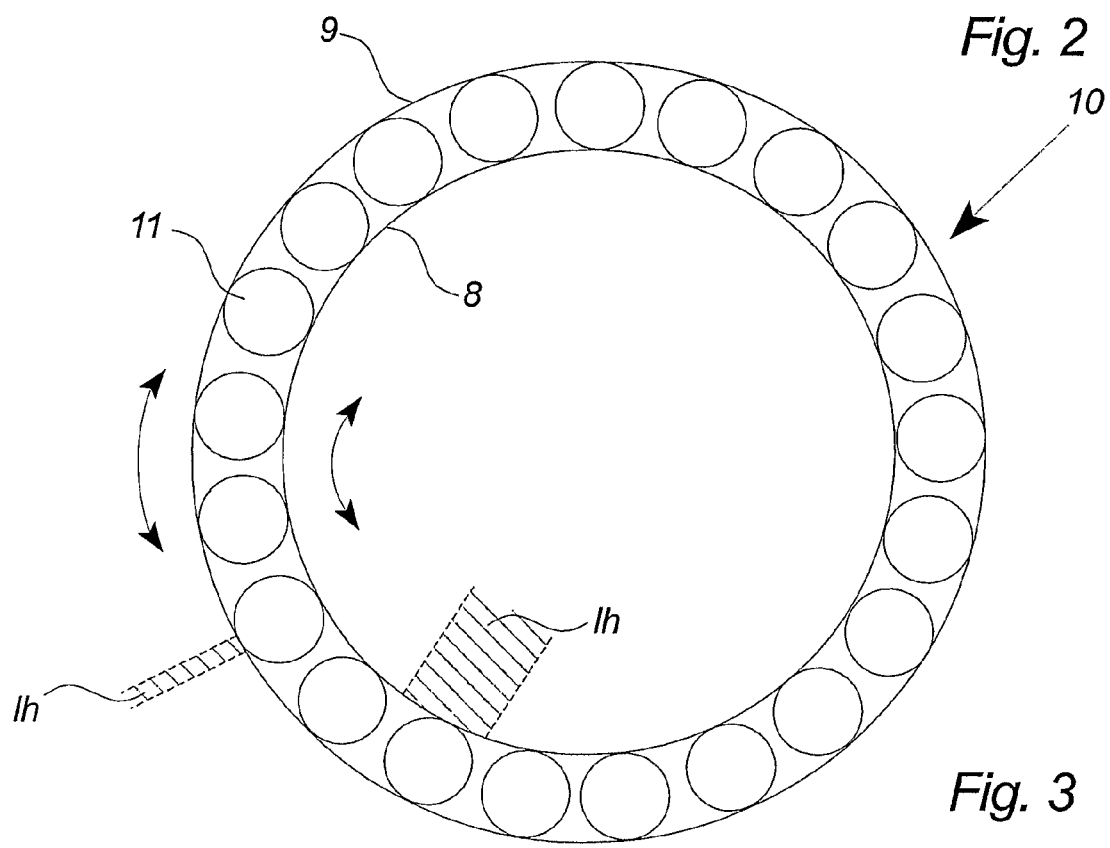
FIG. 3 illustrates a row of bearing balls such as a row of the blade bearing illustrated in FIG. 2.

FIG. 3 illustrates a row of bearing balls such as a row of the blade bearing illustrated in FIG. 2.

The bearing includes an inner and outer bearing ring 8, 9 with a number of bearing rolling elements 11 in between and connecting the bearing rings. The bearing rolling elements may be bearing balls as illustrated in FIG. 2 or bearing rollers.

The row of bearing rolling elements 11 is moveable in the raceways of bearing rings 8, 9 and as such may the bearing rings rotate freely in both directions as indicated with the arrows. The bearing rolling elements may be kept apart or constrained by different types of spacing means such as plastic bearing spacers or a metal bearing cage.

It is further illustrated that the inner and outer bearing rings 8, 9 each have a raceway area lh which has one or more relevant material characteristics which is of a poorer value than the raceway in general. One relevant material characteristic could be a less metal hardening or a higher brittleness in the area lh in comparison with the rest of the raceway.

The less hardened area is considered to be material with at least 15 percent lower hardness in relation to the rest of the raceway. This applies both to Rockwell C (RHC) and Vickers hardness measuring methods.

The two areas lh are illustrated with different size where the larger area lh in the inner bearing 8 may be the filler plug area. The plug closes the hole that was used when entering the bearing balls into the bearing and may subsequently be used as an inspection hole. The area of the plugged hole usually marks the beginning and end of the hardened process as described above.

The smaller area lh of the outer bearing ring illustrates the beginning and end of the hardened process of a bearing ring without a plugged filler hole.

The area lh may also be an area of the bearing ring with poorer relevant material characteristics due to a hardening process overlap.

Figure 4:
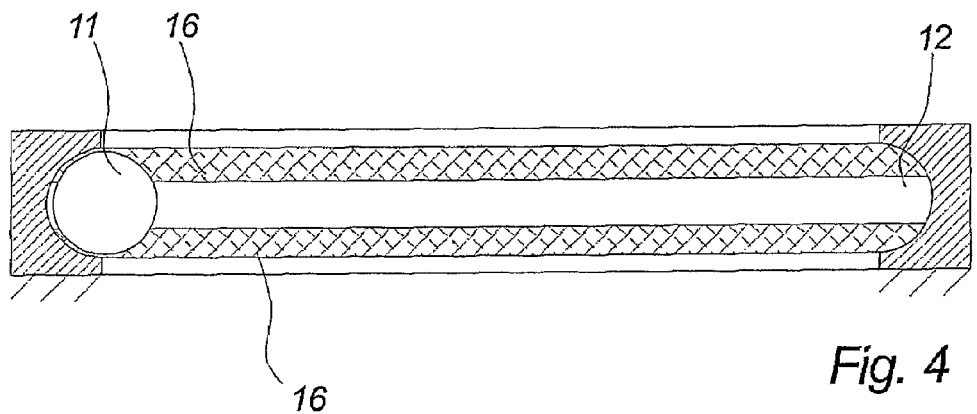
FIG. 4 illustrates contact zones of a bearing.

FIG. 4 illustrates the contact zones 16 in a bearing ring 12 of a ball bearing. The contact zones 16 correspond to the raceway of a bearing ring where the rolling elements (illustrated by a bearing ball 11) may be in contact with the bearing rings and can transfer load force. The contact of the bearing rolling element on the bearing rings may change with the size of load force.

Figure 6A:
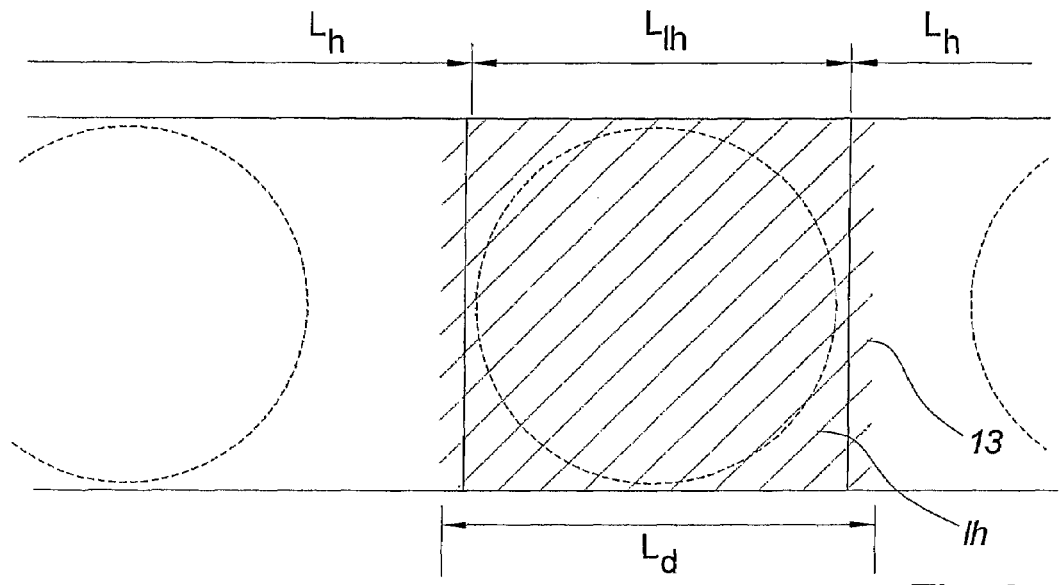
FIG. 6a illustrates schematically in a side view an embodiment of a bearing according to the invention provided with bearing balls.
Figure 6B:
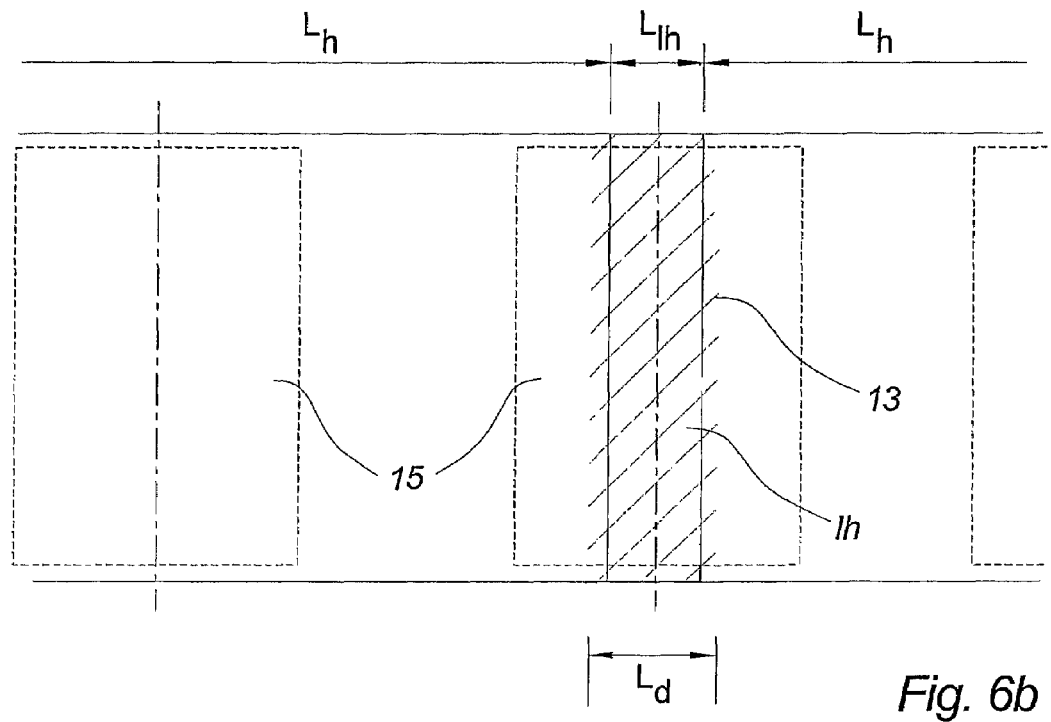
FIG. 6b illustrates schematically in a side view an embodiment of a radial roller bearing according to the invention provided with bearing rollers.
Figure 6C:
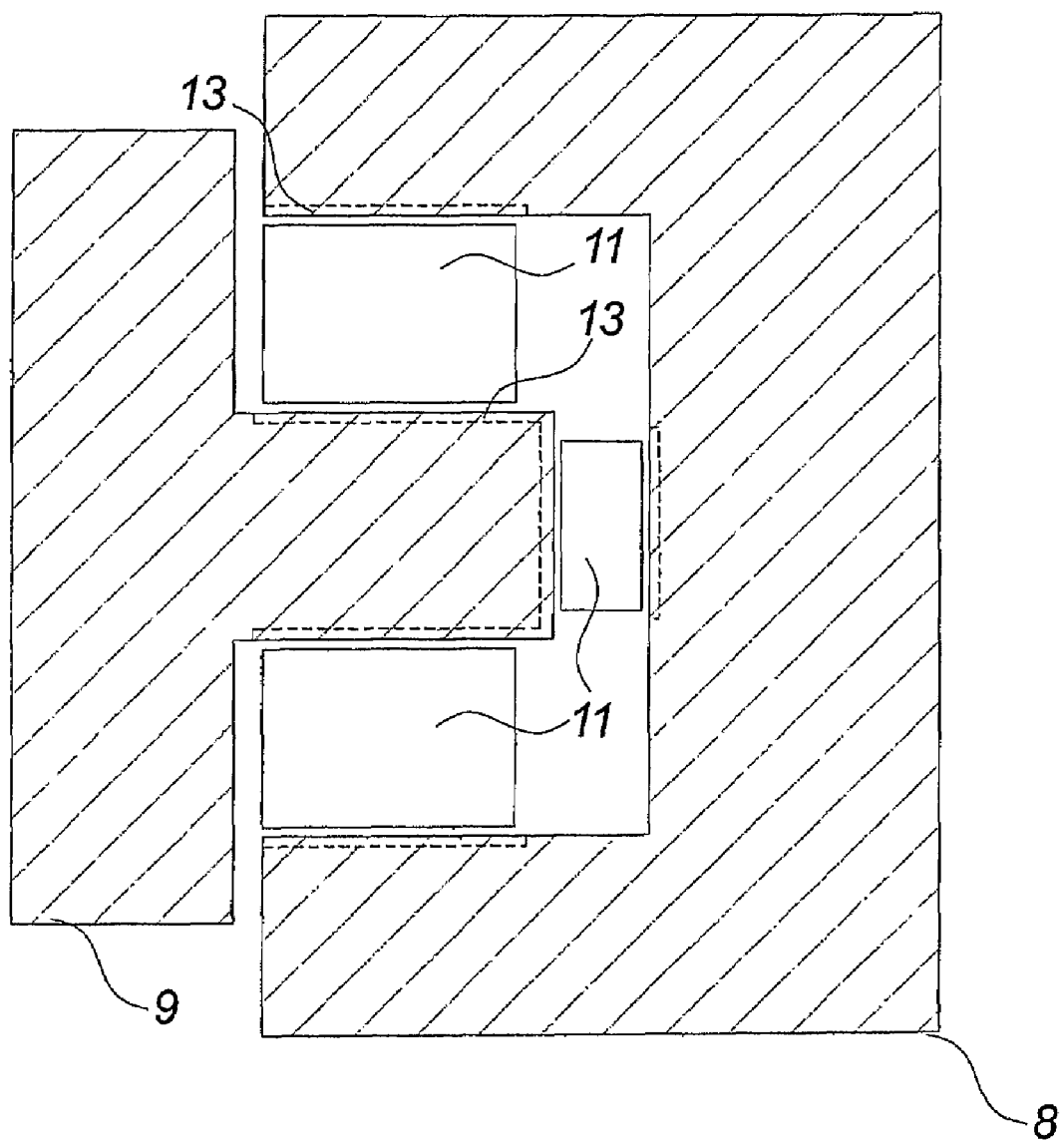
FIG. 6c illustrates schematically a cross sectional view of a three row roller bearing in an embodiment according to the invention.

One or more similar contact zones exist for roller bearing design (e.g. see FIGS. 6b and 6c).

Figure 5:
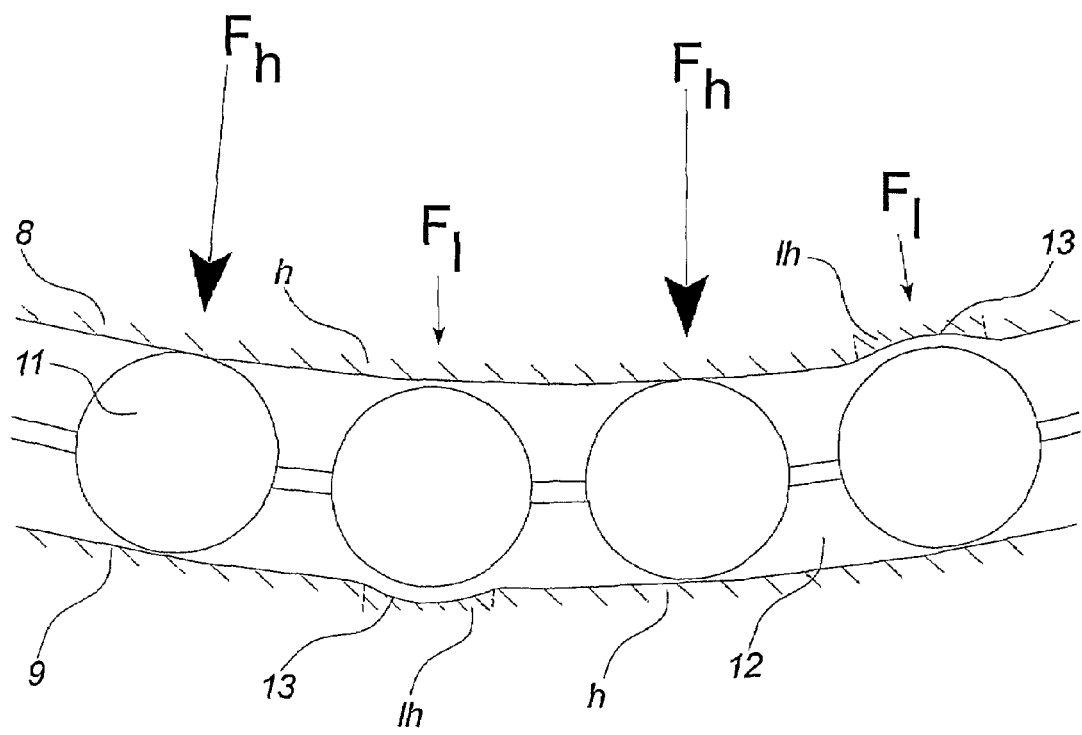
FIG. 5 illustrates a cross view of a section of a bearing according to the invention.

FIG. 5 illustrates a cross view of a section of a preferred embodiment of the bearing according the invention. The section includes four identical bearing rolling elements which are illustrated as bearing balls 11 between the bearing rings 8, 9 and raceways 12. The raceways of the bearing rings 8, 9 both include an indentation area 13 that at least are positioned in the area lh of the bearing rings.

The figure illustrates that the bearing balls, surrounding a bearing ball in an indentation area 13, hold a high load force $F_h$ while the bearing ball in the indentation area 13 only holds a lower load force $F_l$, preferably a negligible or no load force. Consequently, the indentation areas experience less or no load force from the bearing balls in the indentation areas.

The load force $F_l$ of the bearing ball in the indentation area 13 is low or non-existing. The distance in the indentation area 13 in relation to two opposite bearing contact zones 16 of the bearing is similar or larger than the diameter of the bearing ball. Consequently, the other bearing balls that are positioned in the hardened part of the raceway carry the high load force $F_h$ of the bearing.

FIG. 6a schematically illustrates the indentation area 13 in a section of the bearing raceway 12. The illustration is viewed from the center of the bearing radial out towards the bearing rings, with e.g. the inner-ring removed. Or seen from outside the bearing rings radial inwards the bearing center with the outer ring removed. Three bearing balls (illustrated with dotted lines) are positioned in the raceway and with the second ball entering down into the indentation area 13.

The figure illustrates an embodiment where the bearing raceway is divided into a hardened portion of the raceway and a less hardened portion or area lh of the raceway. The less hardened portion has a length $L_{lh}$ which is much smaller than the length $L_h$ of the hardened portion e.g. a length $L_{lh}$ substantially corresponding to the size of the filler plug hole i.e. a little larger than the diameter of a bearing ball and less than twice the ball diameter.

The figure also illustrates that the indentation area 13 may go beyond the area of the less hardened portion and may extends into the hardened part of the raceway e.g. by having length $L_d$ being longer than $L_{lh}$.

The figure also illustrates that the length $L_d$ of the treated indentation area 13 may extend beyond the less or unhardened portion of the raceway e.g. into one or both approximate areas of the hardened portion (as will be explained further in relation to FIG. 9).

The length $L_{lh}$ may for example be between 0.5 and 1 centimetre in relation to a total bearing diameter of more than one meter. The length of the indentation area $L_d$ is preferably less than 15 degrees of the length of a raceway. A length of the indentation area $L_d$ corresponding substantially to one ball diameter $D_b$, e.g. corresponding to the filler plug area in a bearing ring, the following could be the case: 7.9 degrees for a 4 point contact ball slewing ring bearing with a 40 millimetre ball and a bearing radius of 291.5 millimetre. Or for the same type of bearing with 53.98 millimetre ball and bearing radius of 955 millimetres equals 3.2 degrees.

The diameter of a bearing ball may for example be 38.10, 44.45, 50.80, 53.98, 63.50, 76.20 or 101.60 millimetres as well as other dimensions.

FIG. 5b schematically illustrates the indentation area 13 in a section of the bearing raceway 12. The illustration is viewed from the center of the bearing radial out towards the bearing rings, with e.g. the inner-ring removed. Or seen from outside the bearing rings radial inwards the bearing center with the outer ring removed.

Three bearing rollers 15 (illustrated with dotted lines) are positioned in the raceway and with the second roller entering down into the indentation area 13.

The less hardened portion has a length $L_{lh}$ which is much smaller than the length $L_h$ of the hardened portion and less than the roller (or ball) diameter e.g. approximately 0.2 of the roller (or ball) diameter.

FIG. 6c illustrates schematically a cross section of an embodiment of a slewing bearing according to the invention.

The bearing is illustrated as a triple row roller bearing (3RRB) but may also include two rows of rollers (upper and lower row; carrying bending/tilt moments as well as axial load force) and a single row (middle row; carrying radial load force) of bearing balls (2 RRB+1 RBB). Each indentation area 13 of the six bearing raceways is illustrated with dotted lines.

The combined radial and thrust rows of rolling elements in the 3RRB or 2 RRB+1 RBB bearing may be used in applications of very heavy loads such as wind turbines or cranes.

Figure 7:
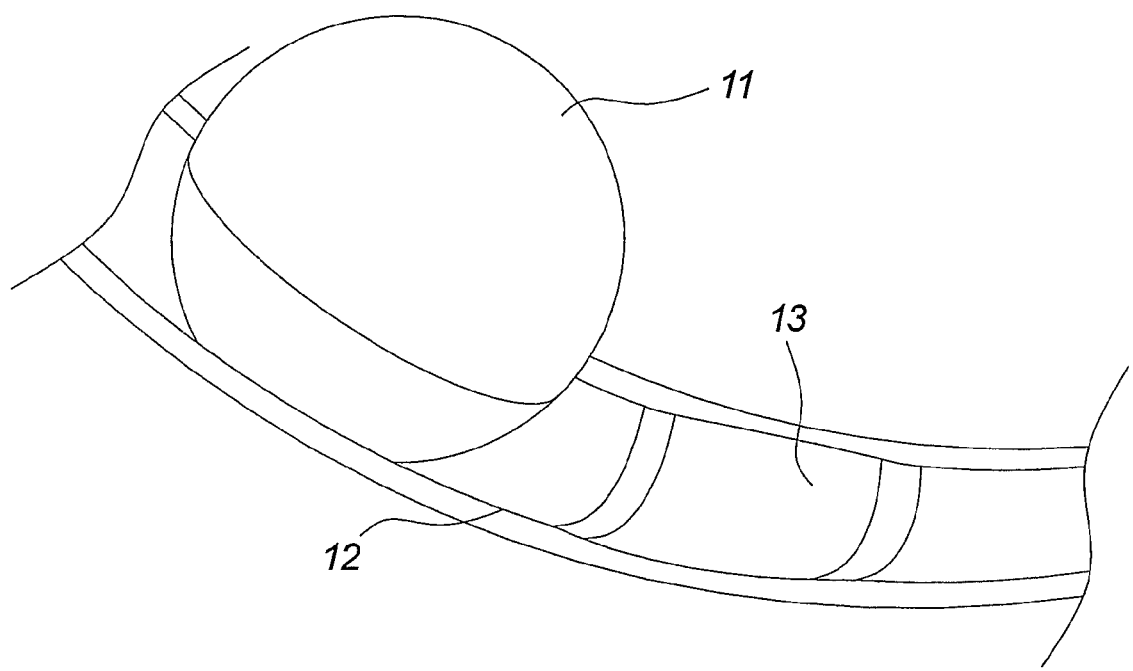
FIG. 7 illustrates in perspective a section of a bearing raceway with an indentation according to a preferred embodiment of the invention

FIG. 7 illustrates a preferred embodiment of a bearing according to the invention and especially a section of a bearing raceway 12 in perspective including one bearing ball 11 of many balls in a bearing row. The balls may stay in the position or move in the raceway during motion between the fixed and moving parts connected through the bearing. Further, the other bearing balls will transfer full load force from one bearing ring to the opposite bearing ring when one or more bearing balls are in indentation areas and transfer less or no load force. A standard bearing raceway usually comprises 30 to 120 bearing rolling elements.

The figure also illustrates an indentation area 13 in the raceway where the length of the area is smaller than the diameter of the bearing ball 11. The indentation area is an indentation at least in a less or unhardened part of the raceway as explained above.

The indentation area stretches from side edge to side edge of the raceway e.g. shaped as a hole or a groove. Further, the area comprises a double curvature or similar continuous shape in the raceway direction.

The indentation area may also be in parts of the raceway e.g. in the sides of the raceway and not in the low part of the raceway as also explained above (see FIG. 11a).

Figure 8:
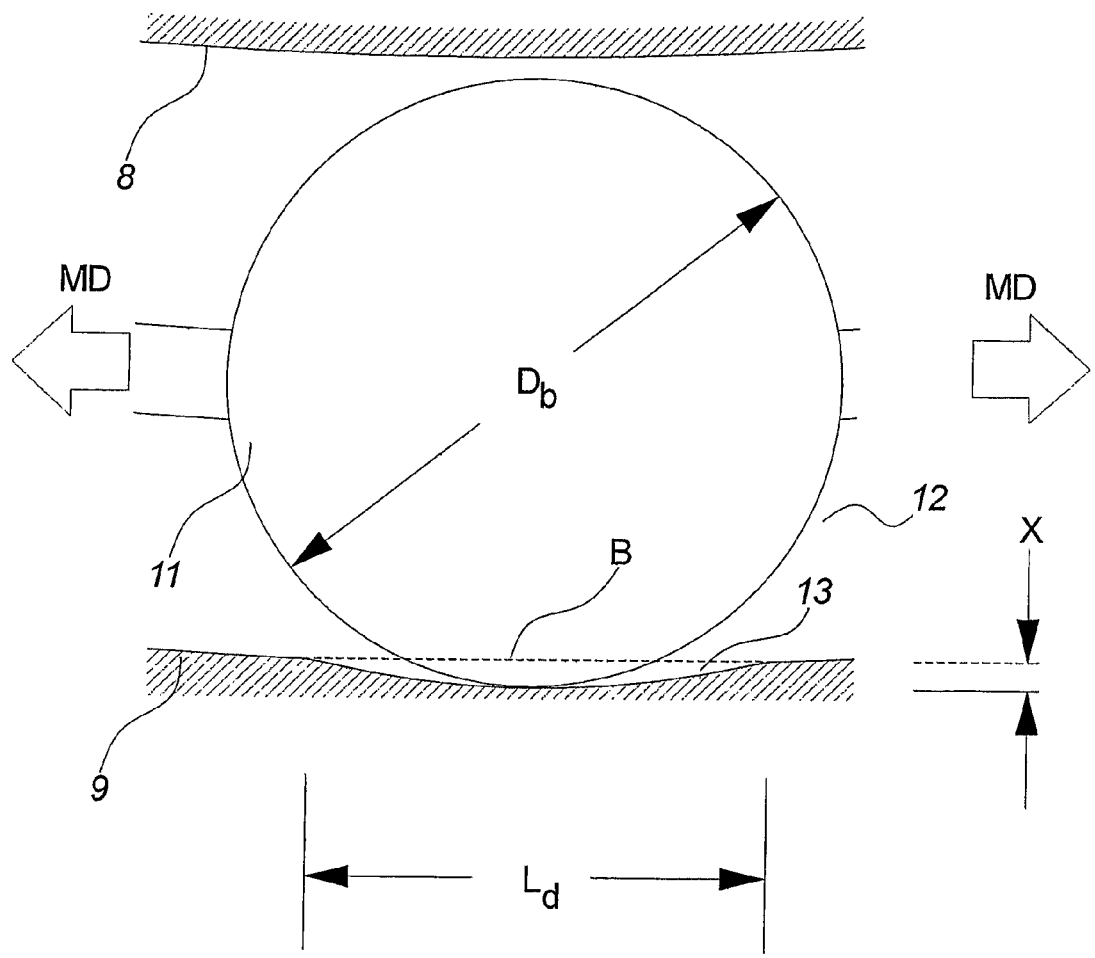
FIG. 8 illustrates a section of the bearing including an indentation area in more details.

FIG. 8 illustrates a bearing rolling element in the indentation area and between the bearing rings 8, 9 in more details.

The bearing ball 11 has a diameter $D_b$ where the diameter is much larger than the depth X of the area at any point along the indentation.

The depth from the base line or shape B of the raceway to the lowest point in the indentation area should be such that the bearing rolling element may return to the normal bearing surface without problems.

The large arrows MD of the figure illustrate the possible movement directions of the bearing rolling element corresponding to the direction of the raceway 12.

Opposite raceways may both comprise indentation areas in another embodiment of the invention i.e. a bearing ball may enter into two indentation areas in stead just one.

Figure 9:
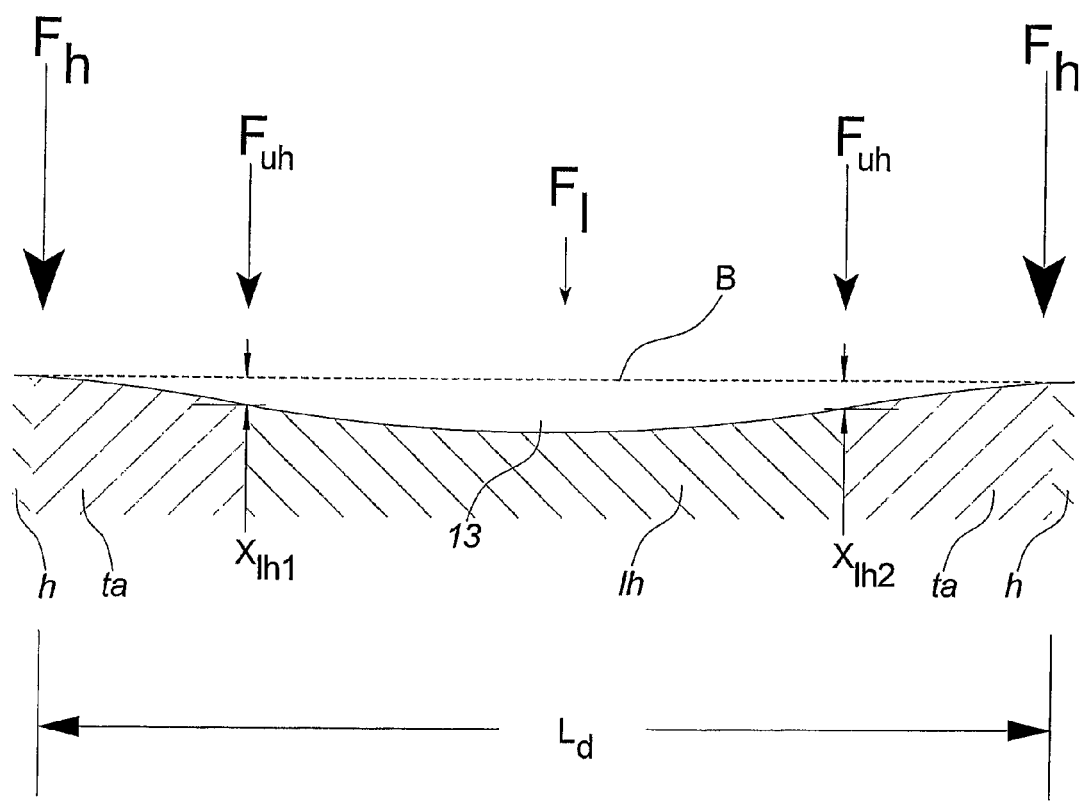
FIG. 9 illustrates schematically the load force of a bearing rolling member in different positions of the indentation area.

FIG. 9 illustrates schematically the load force F of a bearing rolling element in different positions of the indentation area 13. The line B defines a normal contour shape of a bearing raceway.

The indentation area 13 preferably comprises an area of poorer bearing material characteristic lh and two transition areas ta in the adjacent hardened material of the raceway. The transition areas represent the decline from the normal contour shape of the raceway to minimum depths $X_{lh1}$, $X_{lh2}$ at the transition between hardened material and the area of poorer bearing material characteristic lh. Usually the indentation area has a maximum depth between the two minimum depths $X_{lh1}$, $X_{lh2}$ at the end of the transition areas (i.e. at the transition toward the poorer bearing material). The raceway proceeds with a normal contour/shape on the other sides of the transition areas ta.

The shape of the indentation area is seen in the direction of rotation for the bearing and is continuous i.e. without edges. The bearing ball will experience a continuous transition from full load force $F_h$ over less or no load force $F_{lh}$ at end of the transition areas to no or less load force $F_l$ in the poorer bearing material area. The less load force $F_{lh}$ should be close to no load force in such a way that all of the area lh sees little or no load force.

No load or close to no load force may be achieved with diameter/depth ratio corresponding to approximately 38.10 millimetres/0.2 millimetres or 53.98 millimetres/0.6 millimetres depending on bearing size, raceway conformity, bearing loads as well as the stiffness of the surrounding structure that the bearing is mounted on to.

The shape of the indentation area may be a double curvature, a bowl shaped hole, a groove or a similar continuous shape. The shape should be well defined in order to be reproducible by a machine.

Figure 10:
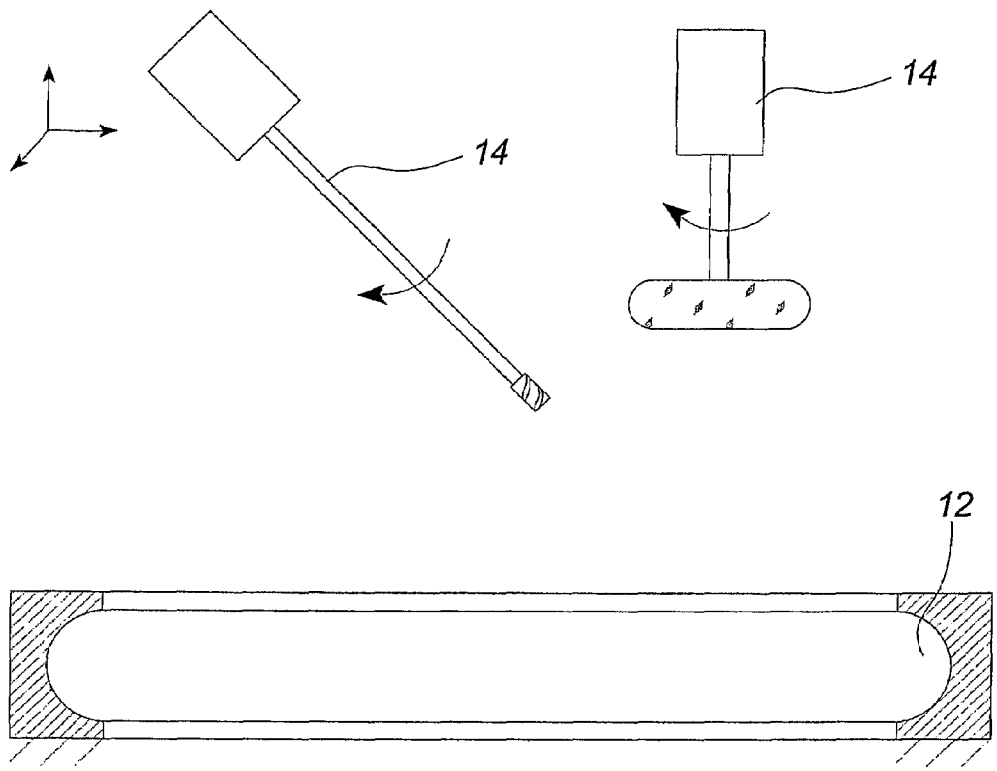
FIG. 10 illustrates different means of a bearing manufacturing process according to the invention.

FIG. 10 illustrates a process step in manufacturing a bearing ring with an indentation area according to the invention.

A material removing process such as a grinding process is used in order to establish the indentation area 13.

The material removing process of the indentation area may in one embodiment of the manufacturing method be performed by entering a grinding or milling machine 14 into the lower part of the raceway and preferably removing material from edge to the bottom of the raceway i.e. perpendicular to the direction of the raceway. Subsequently the bearing ring is tipped around and the process is repeated from the other edge to the bottom of the raceway. Hereby is established an indentation area in the raceway from edge to edge perpendicular to the direction of rotation for the bearing.

The process may also be performed in one step by entering a machine with a dresser stone substantially corresponding in diameter with the diameter of the raceway.

The indentation areas may also be established first by the material removing process in another embodiment of the manufacturing process and the hardening process be performed subsequently on the bearing rings e.g. by starting and ending at the indentation areas.

Figure 11A:
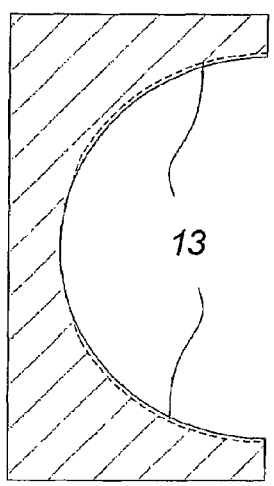
FIG. 11a illustrates an embodiment of the invention with a first type of indentation area.

FIG. 11a illustrates an embodiment of the invention where the indentation area 13 (dotted lines) is established solely in the inner sides of the bearing ring. However, the indentation area may also be established in the bottom of the bearing ring or in the bottom as well as in other positions in order to establish an indentation area with less coverage than from ring edge to edge (across the raceway).

Figure 11B:
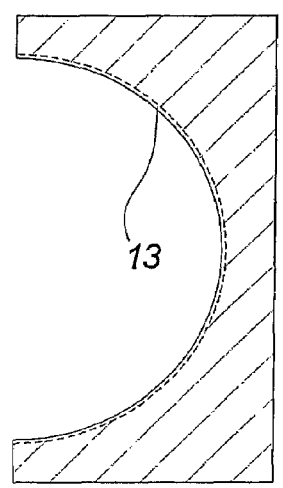
FIG. 11b illustrates an embodiment of the invention with a second type of indentation area.

FIG. 11b illustrates an embodiment of the invention where the indentation area 13 is established from edge to edge of the bearing ring (across the raceway).

The invention has been exemplified above with reference to specific examples of blade bearings in a wind turbine. However, it should be understood that the invention is not limited to the particular examples but may be designed and altered in a multitude of varieties within the scope of the invention as specified in the claims e.g. in relation to other wind turbine bearing as well as other applications involving very large bearings facing axial and radial load forces as well as bending/tilting moments such as large crane, radar or satellite aerial bearings.

LIST

1. Wind turbine
2. Wind turbine tower including at least two tower sections
3. Wind turbine nacelle
4. Wind turbine hub
5. Wind turbine blade
6. Foundation for the wind turbine
7. Blade bearing for a pitch mechanism of a wind turbine blade
8, 9. Bearing rings with raceways for bearing rolling elements 10. Row of bearing rolling elements such as bearing balls or rollers
11. Bearing ball
12. Raceway of the bearing
13. Treated area in the raceway by a material removing process e.g. a grinding process
14. Material removing machine such as a grinding/dresser machine
15. Bearing rollers
16. Bearing contact zone between the bearing rings and rolling elements
B Base line or shape of the bearing raceway
$F_h$ High load force on a bearing rolling element
$F_{lh}$ Lower load force on a bearing rolling element in the indentation area
$F_l$ Lowest load force on a bearing rolling element in the indentation area
$D_b$ Diameter of bearing ball or roller
Lh Less, unhardened or brittle area of the raceway i.e. poorer bearing material
$L_h$ Length of hardened portion of the raceway
$L_{lh}$ Length of poorer bearing material area in the raceway e.g. less or unhardened portion of the raceway
$L_d$ Length of treated area
MD Direction of rotation of the rolling elements
ta. Transition area between the poorer bearing material and standard hardened material of the raceway
X Depth of the treated area
$X_{lh1}$, $X_{lh2}$ Depth in the treated area at the transition between transition area and poorer bearing material

What is claimed is:

1. A bearing comprising
   bearing rings with raceways, and
   at least one row of bearing rolling elements positioned between said rings and in contact with said raceways characterised in that
   at least one of said raceways comprises one or more indentation areas in relation to a standard shape of the raceways
   wherein said indentation area at least being positioned in material of a poorer bearing material characteristic by being less hardened, unhardened or of higher brittleness than a hardened material of the raceway.

2. The bearing according to claim 1, characterised in that said bearing rolling elements are bearing balls or rollers or combinations hereof.

3. The bearing according to claim 1, characterised in that said bearing is a connector between different parts of a wind turbine selected from the group consisting of a blade, yaw, rotor, gear or generator bearing of the wind turbine.

4. The bearing according to claim 1, characterised in that one raceway comprises one indentation area.

5. The bearing according to claim 1, characterised in that each raceway comprises one indentation area.

6. The bearing according to claim 1, characterised in that said indentation area stretches from raceway edge to edge in a direction perpendicular to the direction (MD) of rotation of the rolling elements.

7. The bearing according to claim 1, characterised in that said indentation area only stretches across the sides or bottom of the raceway.

8. The bearing according to claim 1, characterised in that said indentation areas are indentations in relation to a normal base line or shape (B) of the raceways.

9. The bearing according to claim 1, characterised in that each of said one or more indentation areas is less than 360 degrees of the length of a raceway.

10. The bearing according to claim 1, characterised in that each of said one or more indentation areas at least is positioned in a bearing contact zone of a raceway for bearing rolling elements.

11. The bearing according to claim 1, characterised in that said indentation area comprises an area of poorer bearing material characteristic and transition areas (ta) in the adjacent hardened material of the raceway.

12. The bearing according to claim 11, characterised in that said indentation area comprises a hole or a groove shape with a minimum depth ($X_{lh1}$, $X_{lh2}$) at the transition areas (ta).

13. The bearing according to claim 11, characterised in that the shape of said indentation area is well defined and reproducible by machine with a minimum depth ($X_{lh1}$, $X_{lh2}$) at the transition areas (ta).

14. The bearing according to claim 11, characterised in that said indentation area comprises a bowl shaped hole or a groove with a minimum depth ($X_{lh1}$, $X_{lh2}$) at the transition areas (ta).

15. The bearing according to claim 11, characterised in that said indentation area comprises a continuous and smooth shape with a minimum depth ($X_{lh1}$, $X_{lh2}$) at the transition areas (ta).

16. The bearing according to claim 11, characterised in that a minimum depth ($X_{lh1}$, $X_{lh2}$) at the transition area in the indentation area is at least 1 per mil of the diameter ($D_b$) of the bearing balls.

17. The bearing according to claim 11, characterised in that a minimum depth ($X_{lh1}$, $X_{lh2}$) at the transition area in the indentation area is at least 0.7 per mil of the diameter ($D_b$) of the bearing rollers.

18. The bearing according to claim 11, characterised in that said one or more indentation areas comprise a minimum depth ($X_{lh1}$, $X_{lh2}$) at the transition area (ta) of at least 0.04 millimeters in relation to the diameter ($D_b$) of the bearing balls being at least 30 millimeters.

19. The bearing according to claim 11, characterised in that said one or more indentation areas comprise a minimum depth ($X_{lh1}$, $X_{lh2}$) at the transition area (ta) of at least 0.04 millimeters in relation to the diameter ($D_b$) of the bearing rollers being at least 20 millimeters.

20. A wind turbine comprising
    a connector between fixed and moveable wind turbine parts
    wherein said connector includes one or more bearings comprising one or more indentation areas according to claim 1.

21. The wind turbine according to claim 20 wherein said bearings are blade, yaw, rotor, gear or generator bearings.

22. The wind turbine according to claim 20, wherein said wind turbine is in an active stall or pitch regulated wind turbine with fixed or variable speed.

23. The wind turbine according to claim 20 wherein said bearings are blade, yaw, rotor, near or generator bearings experiencing axial and radial load forces as well as bending/tilting moments.

* * * * *